Jan. 10, 1956 R. H. BARKER 2,730,676
PULSE CODE SYSTEMS
Filed Jan. 2, 1952 5 Sheets-Sheet 1

Ronald Hugh Barker
Inventor
By
Stevens, Davis, Miller & Mosher
his Attorneys

Jan. 10, 1956 R. H. BARKER 2,730,676

PULSE CODE SYSTEMS

Filed Jan. 2, 1952 5 Sheets-Sheet 2

Inventor
Ronald Hugh Barker
By
Stevens, Davis, Miller & Mosher
his Attorneys

Jan. 10, 1956 R. H. BARKER 2,730,676

PULSE CODE SYSTEMS

Filed Jan. 2, 1952 5 Sheets-Sheet 3

Ronald Hugh Barker
Inventor
By Stevens, Davis, Miller & Mosher
his Attorneys

Jan. 10, 1956 R. H. BARKER 2,730,676

PULSE CODE SYSTEMS

Filed Jan. 2, 1952 5 Sheets-Sheet 4

Ronald Hugh Barker
Inventor
By
Stevens, Davis, Miller + Mosher
his Attorneys

Jan. 10, 1956 R. H. BARKER 2,730,676

PULSE CODE SYSTEMS

Filed Jan. 2, 1952 5 Sheets-Sheet 5

Inventor
Ronald Hugh Barker
By
Stevens, Davis, Miller & Mosher
his Attorneys

United States Patent Office
2,730,676
Patented Jan. 10, 1956

2,730,676

PULSE CODE SYSTEMS

Ronald Hugh Barker, Christchurch, England, assignor to National Research Development Corporation, London, England, a British corporation Application January 2, 1952, Serial No. 264,573

Claims priority, application Great Britain January 8, 1951

18 Claims. (Cl. 332—11)

The present invention is concerned with pulse code systems sometimes called code digit systems, that is systems in which the amplitude of a signal is represented by a combination or group of signals in accordance with a prearranged code, each group representing a given amplitude level. Each group of signals is a series of signals in one of two states, one state generally being the presence of an electric pulse, and designated by the digit 1, and the other being the absence of a pulse and designated by the digit 0.

The present invention is particularly concerned with pulse code systems in which the signal amplitude is encoded in accordance with a cyclic permuting binary code. This kind of binary code, which is also known as a cyclic progressive, continuously progressive, or staggered step binary code, is characterised in that only one digit signal in each code group of signals changes as the signal amplitude changes by one amplitude level.

Pulse code signals representing the amplitude of a given signal potential are obtained by the following general process. A first code digit is obtained by comparing the signal potential with a reference potential in a slicer or comparison circuit. Then, as a result of this comparison, either one of, or both, the signal potential and reference potential are changed or left unchanged so that the potential difference between them is changed or unchanged. Further code digits are then obtained in a similar manner.

The present invention is characterised in that in a process of this type, the potential difference between the signal and reference potentials is changed between successive comparisons in at least two steps or stages, the first stage being one during which the signal potential is rectified about the reference potential. This rectification stage is one in which the magnitude of the potential difference between the signal and reference potentials is unchanged, but the sign (or sense) of this potential difference either (*a*) is made positive regardless of its original sign or (*b*) is made negative regardless of its original sign.

According to the present invention, a method of obtaining a pulse code signal representing in a cyclic permuting code the amplitude of a signal potential, comprises a first step of obtaining a first code digit according to the result of a comparison between the signal potential and a reference potential having a value within a predetermined range of possible values of the signal potential, a second step of either (*a*) leaving the signal potential unchanged if it is negative with respect to the reference potential, but rectifying it with respect to the reference potential if it is positive with respect to the reference potential or (*b*) leaving the signal potential unchanged if it is positive with respect to the reference potential, but rectifying it with respect to the reference potential if it is negative with respect to the reference potential, the result of the second step in either case being that the possible range of values of the signal potential is reduced, a third step of modifying the value of the signal potential or the reference potential or both so that the reference potential will have the mean value of the reduced range of possible values of the signal potential after the second step, a fourth step of obtaining a second code digit according to the result of a comparison between the present signal potential and the present reference potential, a fifth and sixth step corresponding to the second and third step respectively and so on until a desired number of code digits have been obtained.

In prior pulse code systems in which the amplitude of a given signal potential is represented by a pulse code signal derived by the general process already outlined it will be appreciated that the manner in which the potential difference between the signal and reference potentials is modified at any stage between the obtaining of successive code digits in a comparison circuit is dependent upon the previous code digit obtained. This means that in practice, the circuit arrangements which modify the potential difference between the signal and reference potentials are actually controlled by the comparison circuit to act in accordance with the result of the comparison which has just taken place therein.

Thus systems of this type can generate code digit signals in a serial manner only, as each code digit can be obtained only after the previous code digit is known. This restriction to serial operation is of little consequence to pulse code systems designed to produce pulse code signals at a repetition rate of the order of 10 kc./s., but is of consequence in high-speed systems having repetition rates of at least 200 kc./s.

According to a feature of the invention a pulse code system having comparison circuits for deriving code digits representing the amplitude of a signal potential with respect to a reference potential, and circuit arrangements for modifying the potential difference between the signal and reference potentials between successive derivations of code digits, is characterised in that the modifying circuit arrangements operate independently of the comparison circuits.

Such an arrangement is of particular advantage when a cyclic permutating code is used and steady, non-abrupt changes in signal amplitude can cause only one digit to change at any one time, as it is then not necessary to employ a capacitor to maintain a potential proportional to the signal amplitude, and high frequency components of the signal can be encoded.

Such an arrangement may be employed in a high-speed binary digital computer to derive pulse code signals representing the magnitude of a varying signal potential. As it is possible for the code digits to be derived simultaneously if a number of comparison circuits are employed, the arrangement may be used to generate the code digit signals on parallel channels.

Practical forms of the invention and further features of the invention will now be described with reference to the drawings filed with this specification in which:

Figure 9 shows a basic circuit of a balanced slicer as shown in Figures 2, 3, and 8; while

One typical method of obtaining, in accordance with the invention, a series of code digits representing the amplitude of a signal potential in a cyclic permuting code will now be described with reference to Figure 1.

Figure 1:
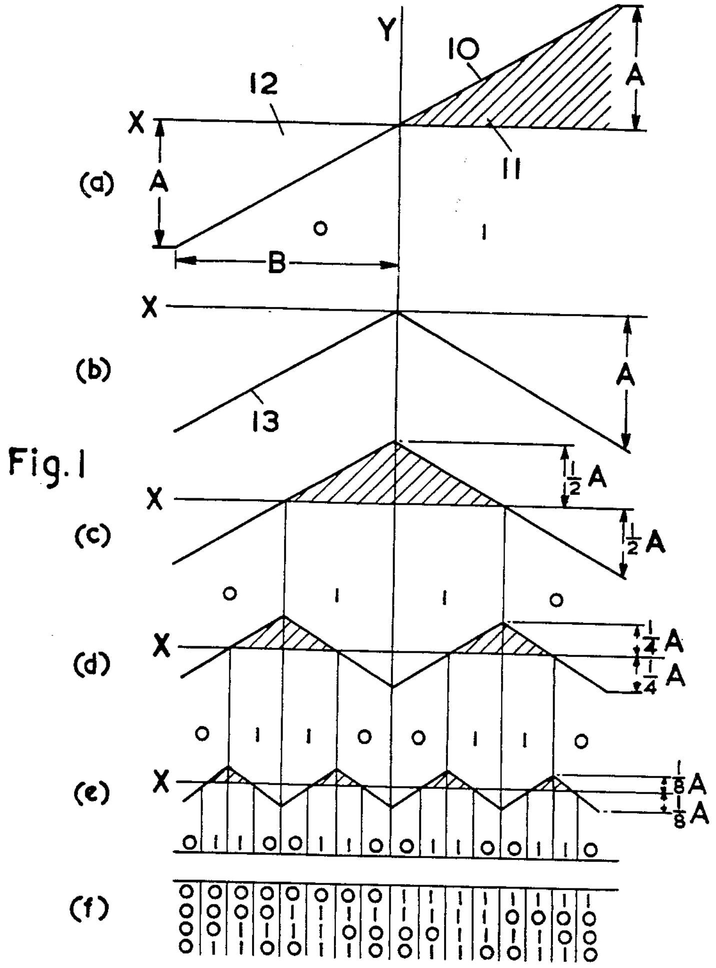
Figure 1 shows a series of graphical diagrams explaining a typical method of coding according to the invention.

Figures 1(*a*) to 1(*e*) are a series of diagrams showing the manner in which applied signal potentials are modified stage by stage in the derivation of four successive code digits. These figures depict the modifications effected on applied signal potentials of any value within the total range of possible values. In each figure, the range of possible values of the applied signal potential 2B is represented as the range of horizontal X-axis values, the lowest value −B being at the left-hand side and the highest value +B being at the right-hand side of each figure. The range of possible values of the resulting signal potential at various stages in the coding process, after it has undergone modifications through the preceding stages, is represented as the range of vertical Y-axis values in each diagram, that is, each figure is an applied signal potential-modified signal potential graph. Thus, for example, at the stage represented in Figure 1(*c*), as a result of the operations already carried out in the coding process, originally applied signal potentials of −B, −½B, 0, +½B and +B have become potentials of −½A, 0, +½A, 0 and −½A respectively, with respect to a reference level X. This reference level X (as more fully explained hereafter) is the level of a reference potential with respect to which code digit determinations take place.

The total range of values of various applied signal potentials which are required to be coded may be greater or less than that required to give the total range of output values, 2A say, which the apparatus is designed to deal with. Each applied signal potential is therefore initially amplified or attenuated so that the total range of output values is 2A. This preliminary step is illustrated by Figure 1(*a*), which shows the linear reduction of applied signal potentials within an amplitude range of 2B to produce output signal potentials within an amplitude range of 2A, the mean potential within the range being unchanged. The slant line 10, therefore, represents a continuous gamut of potential values, the X-axis co-ordinate of any given point on the line being the initial value of an applied signal potential, and the Y-axis co-ordinate being the value within the permitted range 2A as a result of the preliminary step.

The first coding opertaion determines whether the modified input signal potential is positive or negative with respect to a reference potential X, which is arranged to be at the mean level of the permitted range of values 2A. As shown in Figure 1(*a*), the shaded region 11 corresponds to an input signal which is positive with respect to the reference potential X and to which the code digit 1 is arbitrarily assigned, and the unshaded region 12 corresponds to a negative input signal to which the code digit 0 is arbitrarily assigned. This operation, of course, yields the most significant code digit.

The next step is to full wave rectify the signal potential with respect to the reference potential X. If the rectification is carried out so that the output signal potential is made negative with respect to the reference potential regardless of its original value the resulting possible values of the signal potential become those represented by the line 13 shown in Figure 1(*b*). The result of this step is that the possible range of values of the signal potential has been reduced from 2A to A. Before a further code digit can be obtained it is necessary to arrange that the reference potential, with which the signal potential is to be compared, is the mean value of the reduced range of possible values of the signal potential. This may be carired out by increasing the value of the signal potential by ½A, whatever its previous value. The effect of this step is shown in Figure 1(*c*).

A second code digit is obtained by determining whether the resulting signal potential is positive or negative with respect to the reference potential X. As shown in Figure 1(*c*), the shaded region corresponds to signal potentials to which the code digit 1 is assigned. The rectifying step is repeated and the value of the signal potential is increased by ¼A so that the possible values of the signal potential are as shown in Figure 1(*d*).

The operation is then repeated to determine as many more digits in the code as may be desirable or practicable. The amount added to the signal potential at each successive stage is halved, that is, is ½A, ¼A, ⅛A etc. Figures 1(*c*), 1(*d*) and 1(*e*) show the range of values of the signal potential after the first three modifying potentials ½A, ¼A, and ⅛A have been added. The number of code digits obtained is one greater than the stages of potential modification, and thus four code digits are obtained at the signal states illustrated in Figures 1(*a*), 1(*c*), 1(*d*) and 1(*e*) between which three stages of potential modification have taken place. The results of each code digit determination are shown in each of these figures, and the combined result of encoding to four digits is shown in Figure 1(*f*), in which the most significant digit is shown at the top. The code will be recognised as a cyclic permuting code, as only one digit changes between successive amplitude levels.

It will be appreciated that the rectifying steps may be such that the signal potential is made positive with respect to the reference potential regardless of the original value without affecting the essential features of the process.

Figure 2:
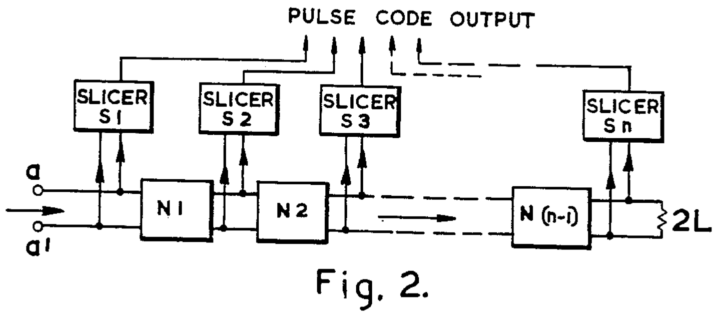
Figures 2, 3 and 8 show schematic circuit arrangements for carrying out the invention.

One form of practical arrangement for carrying out this process is shown in Figure 2. The signal to be coded may be conveniently regarded as being in the form of a push-pull signal consisting of two potentials which are balanced about a mean potential, which is generally earth potential. The potential difference between the two potentials constitutes the information, that is the signal potential, to be coded. It will be appreciated, however, that the push-pull signals are in effect equivalent to a signal potential and a reference potential balanced about earth potential.

The push-pull signal is applied through terminals *aa'* to a series of potential modifying networks N1, N2 . . . N(*n*—1), which are coupled directly together so that each network is matched to the next and power from the input signal passes right through to the last network N(*n*—1) which is terminated by its correct load resistance 2L. Each network is designed to modify each push-pull signal potential in a manner corresponding to the manner in which a single signal potential is modified by rectification and voltage addition as previously described between the stages shown in Figures 1(*a*) and 1(*c*), 1(*c*) and 1(*d*), and 1(*d*) and 1(*e*). The signal potentials appearing on the interconnections between the successive networks are therefore applied to a number of slicer or comparison circuits S1, S2 . . . S*n* which derive code digit signals in a manner which will be described with reference to Figure 9. These code digit signals are available substantially simultaneously on the *n* output channels from the slicers S1 to S*n* and they may be pased along these *n* channels to a parallel operating digital computer for example.

Figure 3:
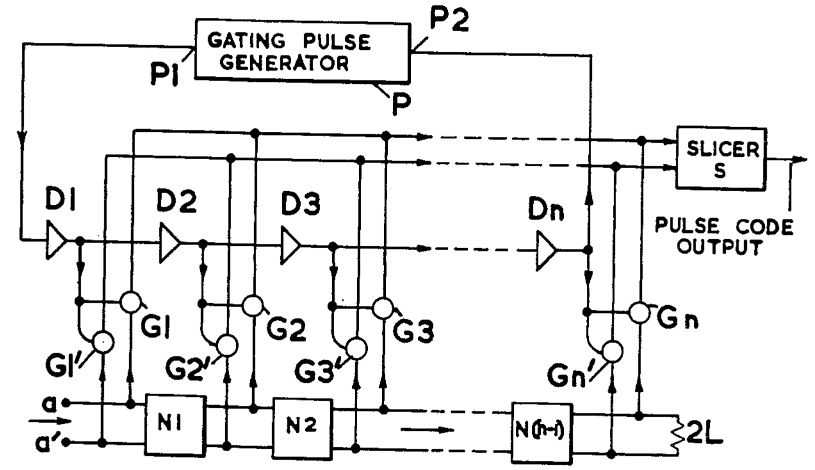

An alternative arrangement is shown in Figure 3. The push-pull signal is applied via the terminals *aa'* to the series of networks N1 to N(*n*—1) and the potentials appearing on the interconnections between these networks are applied through gates G1 and G1', G2 and G2', . . . G*n* and G*n'* to a slicer or comparison circuit S. These gates are arranged to be opened in a definite sequence during successive code digit periods by the action of a gating pulse generator P, which produces an output pulse of one digit period duration every *n*th digit period, and which acts through a series of pulse delay units D1 to D*n* each producing a digit period delay with the result that the potentials applied to the gates G1 and G1' are applied to the slicer S during a first code digit period, the potentials applied to the gate G2 and G2' are applied to the slicer S during a second code digit period, and so on. The output from the slicer S therefore constitutes a pulse code signal group in serial form. With the apparatus connected as shown in Figure 3, this pulse code signal group will consist of $n$ code digits with the most significant digit leading and the least significant digit last. In serial operating digital computers the least significant digit in each group is required to lead and if the apparatus is required to supply a serial operating digital computer it may be convenient to apply the outputs from the various gates to the slicers in the order G$n$ and G$n'$, G$(n-1)$ and G$(n-1)'$ . . . G1 and G1'. This could be arranged simply by reversing the connections P1 and P2 of the generator P. The gates G1, G1' etc. may be double diode gates which are arranged to pass the least positive applied potential and the gating voltage applied from the generator P is then arranged to be more positive than the highest possible positive potential. A double diode gate is described in copending application of James Hardy Wilkinson, Serial No. 202,615, filed December 26, 1950, now Patent No. 2,686,632, issued August 17, 1954, with reference to Figure 3.

Figure 4:
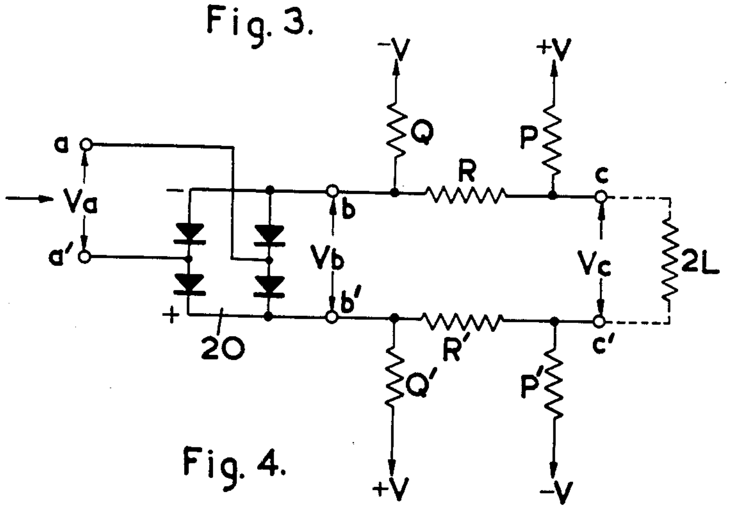
Figures 4, 5, 6 and 7 are circuit details of the signal potential modifying networks shown in Figures 2, 3 and 8.

A typical network N1 or N2 etc. as shown in Figure 2 or 3 is shown in Figure 4. The push-pull signal is applied from $aa'$ to a rectifier bridge 20 comprising four rectifiers each of which may be a suitable unilateral conducting device such as a metal or crystal rectifier or diode valve, and which are connected as shown so that whatever the relative polarity of the voltages on $a$ and $a'$ the voltage produced at $b'$ will always be positive with respect to the voltage produced at $b$. Thus the relation between the voltage $V_a$ across $aa'$ and the voltage $V_b$ across $bb'$ is $V_b=-|V_a|$. A resistance network comprising the resistances P, P', Q, Q', R and R' is connected to supply voltages +V and −V as shown so that a voltage ½A, ¼A, or ⅛A etc. depending upon the stage, is added to the voltage on $b$ and is subtracted from the voltage on $b'$.

It will be appreciated that the resistances P', Q', and R' for example, may be dispensed with and the resistances P, Q, and R may be arranged to add a voltage A, ½A, ¼A etc. depending upon the stage, to the voltage on $b$. This arrangement has the disadvantage that slicers connected between successive stages have to deal with different potential levels and so is not suitable for employing in the arrangement shown in Figure 3. The networks introduce some attenuation of the signal and it is desirable to make the resistance P as large as possible. The voltage $V_c$ at the output terminals $cc'$ of the first stage is $$Ve=k(v-|Va|) \qquad (1)$$

where $k$ is a constant representing the attenuation and $v$ is half the maximum permitted value of the voltage $V_a$. The resistance Q is necessary to ensure that the input impedance at $aa'$ is (assuming perfect rectifiers) a linear resistance. The equivalent load resistance of the succeeding stages is symbolised by the resistance 2L.

Figure 5:
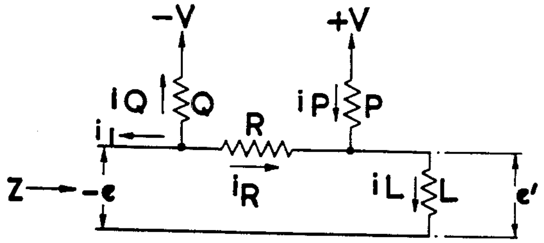

Figure 5 shows the equivalent circuit of the upper symmetrical half of the circuit shown in Figure 4. In Figure 5, Z is the input resistance, $e$ is the input voltage and $e'$ is the output voltage, and the current flowing in an element X say, is denoted by $i_X$. The basic equations of this circuit are as follows:

$$-i_1=i_Q+i_R$$

i. e.

$$i_1=(e-V)/Q+(e+e')/R \qquad (2)$$

$$i_L=i_R+i_P$$

i. e.

$$e'/L=-(e+e')/R+(V-e')/P$$

$$\therefore e'=\frac{LP}{LP+RP+RL}\left(\frac{R}{P}V-e\right) \qquad (3)$$

From Equations 3 and 1:

$$k=LP/(LP+RP+RL) \qquad (4)$$

and $$\frac{R}{P}V=\tfrac{1}{2}v_n \qquad (5)$$

where the suffix $n$ indicates that the equation refers to the $n^{th}$ stage or network.

The input resistance Z of the stage is given by $$\frac{e}{i_1}$$

From Equations 2 and 3:

$$\frac{i_1}{e}=\frac{1}{Q}+\frac{1}{R}(1-LP/(LP+RP+RL))+\frac{V}{e}(L/(LP+RP+RL)-1/Q)$$

The input current is proportional to voltage only if the term $$\frac{V}{e}$$

is removed. Q is therefore chosen so that $$Q=P+R+\frac{RP}{L} \qquad (6)$$

and the input resistance is then a linear resistance given by:

$$Z=\frac{QL}{P+2L} \qquad (7)$$

The maximum output voltage of the $n^{th}$ stage is the maximum input voltage of the $(n+1)^{th}$ stage and is given by:

$$v_{n+1}=\frac{P}{Q}v_n-\frac{R}{Q}V$$

substituting from Equation 5 gives $$\frac{V_{n+1}}{v_n}=\frac{1}{2}\frac{P}{Q} \qquad (8)$$

The maximum voltage developed across the load can therefore be obtained by making the resistance P as large as practicable and the resistance R as small as practicable. It is more reasonable however to obtain the maximum power into the load. Let $$x=\frac{P}{L}$$

If the input impedance Z of the network is treated as a constant as it must match the source, the conditions of maximum power transfer is given by:

$$x^2=2\left(1+\frac{2V}{v_n}\right) \qquad (9)$$

The following are design equations to be obeyed whether or not maximum power transfer is required:

$$Q=(2+x)Z$$

$$P=\frac{2V(2+x)}{2V+(1+x)v_n}\cdot Z$$

$$R=\frac{1}{2}\frac{v_n}{V}P$$

It is, of course, implicit that the input resistance Z of a symmetrical half of one network is equal to the correct terminating resistance L of a symmetrical half of the preceding network.

The voltage V which appears in these equations can be made equal to the amplitude of the voltage range A but it is desirable to use as high a voltage as possible, generally the full supply voltage, to reduce the attenuation in earlier stages.

The design relations given have assumed perfect rectifiers, with zero forward resistance and infinite back resistance. With practical rectifiers corrections must be made to take these resistances into account. A limit to the number of stages that can be employed is the fact that the rectification is imperfect at low voltages and causes the points of the W's of the charactersitic as depicted in Figure 1($e$) say, to become rounded.

In the method previously described the signal becomes more and more attenuated at each stage and in the end slicing becomes difficult. An alternative method is to use an amplifier with a gain of two at each stage to amplify the value of the signal potential by a factor of two. When this is done the amplitude of the shifting or modifying voltage to be added at each stage remains constant at ½A.

Figure 6:
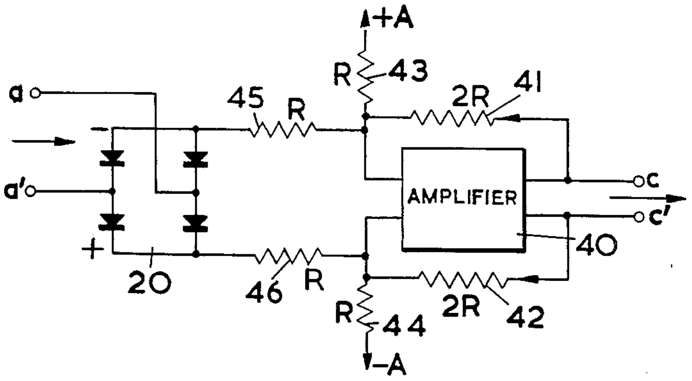

The basic circuit of a single stage employing this method is shown in Figure 6. The input potential is applied at $aa'$ to the rectifier bridge 20 and the output is taken from $cc'$ as in the circuit shown in Figure 4. In order to stabilise the gain accurately at 2 a high gain amplifier 40 with a large amount of negative feedback is employed. Feedback resistances 41 and 42 have values of 2R while resistances 43, 44, 45 and 46 have values of R as shown. The resistances 43 and 44 are connected as shown to sources of potential +A and −A respectively so that the required modifying potential is added. The feedback resistance value 2R needs slight correction if the amplifier gain is less than infinite. The actual value of R should be high compared to the forward resistance of the rectifier 20 but not too high as otherwise stability will suffer. A value of say 30,000 ohms may be used when germanium crystal rectifiers are employed.

Details of the basic circuit arrangement shown in Figure 6 for carrying out one rectification step, amplifying the rectified signal by a power of two and modifying it by a fixed potential so that it may be applied to a succeeding similar circuit arrangement, will now be described in connection with Figure 7.

This circuit arrangement has provisions for compensating to a considerable extent for the rounding of the points of the W's of the signal potential characteristic which occurs during rectification, as shown in Figure 1($e$) for example. A coding arrangement using this circuit can thus be made to operate to an increased number of code digits.

Figure 7:
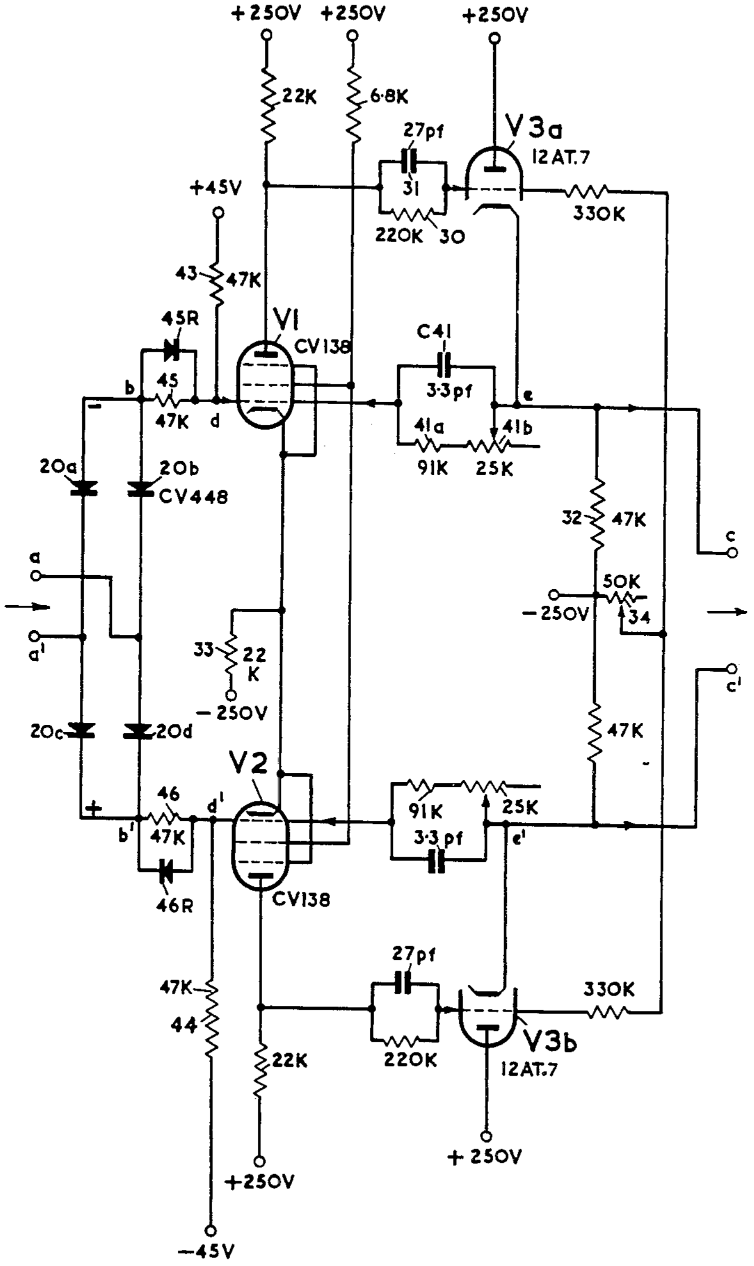

The signal potential, balanced about earth potential and already modified by any preceding stages, is applied across points $aa'$ to a rectifier bridge comprising four rectifiers 20$a$, 20$b$, 20$c$ and 20$d$ arranged as shown in Figure 7 so that, as previously described, whatever the polarity of the potential applied across $aa'$, the potential appearing at point $b$ will be negative with respect to the potential appearing at point $b'$. These potentials are then applied to the grids of valves V1 and V2 through input resistors 45 and 46 respectively, and rectifiers 45R and 46R respectively, connected in parallel with the resistors in the manner shown. The rectifiers 45R and 46R are employed to compensate for the usual bend in the current-voltage curves of the rectifiers 20$a$, 20$b$, 20$c$ and 20$d$ in the neighbourhood of zero applied voltage and thus maintain the voltages at the points $d$ and $d'$ on the grids of the valves V1 and V2 respectively, substantially at the value they would have if the ratio of the forward to back resistance of these rectifiers were very high.

The rectifiers 20$a$, 20$b$, 20$c$, 20$d$, 45R and 46R employed are all germanium crystals CV448, and the resistance of this crystal is about one megohm when a voltage of 10 volts is applied in the inverse direction. As the inverse voltage is decreased, the resistance falls slowly at first and then more rapidly as zero voltage is approached, having a value of about one kilohm at zero applied voltage. The resistance continues to fall as voltage is applied in the conducting direction, and is about 200 ohms when the voltage is 1 volt.

It will thus be appreciated that for small input voltages (less than 1 volt) the ratio of the forward to back resistance of the rectifiers 20$a$, 20$b$, 20$c$ and 20$d$ will not be high and the voltage appearing across the points $b$ and $b'$ will be less than the input voltage appearing across points $a$ and $a'$. As the points $d$ and $d'$ are maintained substantially at zero potential (in a manner which will be later described), the voltage applied across the resistors 45 and 46 and the rectifiers 45R and 46R in the inverse direction will be mainly dependent upon the input voltage. Hence when the input voltage is of the order of 1 volt, the rectifiers 45R and 46R will reduce the equivalent resistance between the points $b$ and $d$ and the points $b'$ and $d'$ respectively so that the decreased voltage across $b$ and $b'$ is substantially compensated for and the voltages on the grids of the valves V1 and V2 are substantially unaffected by the characteristics of the rectifiers 20$a$, 20$b$, 20$c$ and 20$d$.

The valve V1 operates as a high gain amplifying valve in the normal manner and the negative potential at point $d$ is applied to its control grid. The valve V2 operates in a similar manner and the positive potential at point $d'$ is applied to its control grid. The point $d$ is also connected to a source of positive potential $+A/2$ volts through a resistor 43 so as to modify the value of the potential at the point $d$ by $A/2$ volts, while the point $d'$ is also connected to a source of negative potential $-A/2$ volts through a resistor 44 so as to modify the value of the potential at the point $d'$ by $A/2$ volts; for the purpose of modifying the signal potential according to the invention. The manner in which this is carried out will be described after the rest of the circuit has been described. The cathodes of the two valves V1 and V2 are connected through a common resistor 33 to a source of negative potential so that the valves act as a long-tailed pair and give an output which is proportional to the difference between the two voltages present at the points $d$ and $d'$.

The circuit between the valve V1 and point $c$ which deals with the negative potential will now be described, and as the circuit between the valve V2 and point $c'$ which deals with the positive potential is similar in arrangement and function, this description is applicable to it also.

The anode of valve V1 is coupled through a resistor 30 and capacitor 31 (which improves the high-frequency response of the amplifier), to the grid of a valve V3$a$ which is physically half of a double-triode valve 12AT7. The valve V3$a$ is connected as a cathode follower having a cathode load resistance 32. The output potential is generated across $cc'$, the point $c$ being connected to the cathode of the valve V3$a$ and the point $c'$ being connected to the cathode of valve V3$b$ in a similar manner.

The cathode of the valve V3$a$ is also connected through a variable resistor 41$b$ and a fixed resistor 41$a$ to the grid of the valve V1 to provide a negative feedback path for the output from the anode of the valve V1. A condenser C41 also connects the cathode of the valve V3$a$ back to the grid of the valve V1 in order to improve the high-frequency feedback and stabilise the amplifier against unwanted high-frequency oscillation. The resistor 41$b$ is adjusted so that the amount of negative feedback limits the effective gain of the amplifier to 2. If the gain of the amplifying valve V1 were infinite the value of the combined resistances of the resistors 41$a$ and 41$b$ would be adjusted to 2R, where R is the resistance value 47K of the resistors 43 or 45 (see Figure 6), but in practice will need to be slightly greater than 2R as the gain is of course not infinite.

The manner in which the potential on the grid of the valve V1 is modified will now be described, the action on the grid of valve V2 being similar. Let the input voltage applied to terminal $a$ be $v$ and let the value by which the input voltage is required to be modified by the stage in accordance with the invention as described in connection with Figure 6 be $A/2$ volts, where A volts is the maximum amount by which the point $b$ goes negative and the point $b'$ goes positive. Also let the output voltage appearing at $c$ be V volts. Then the following relationship is required to relate the voltage values:

$$-V=2v+A \qquad (10)$$

The minus sign is due to the inherent change in sign between the input and output of a single valve stage amplifier.

Due to the large negative feedback which reduces the gain of the valve V1 from a very high value to 2, it may be assumed to a first approximation that the potential on the control grid will change very little while it is operating on its normal grid base. The basic equation for the currents flowing at the point $d$ is then $$A/2R_A+V/R_F+v/R_i=0 \qquad (11)$$

where $R_A$ is the value of the resistor 43,
$R_F$ is the combined value of the feedback resistors 41$a$ and 41$b$ and
$R_i$ is the value of the input resistor 45.

But $$R_F=2R_A=2R_i=2\times 47\text{K ohms}$$

Hence $$A/2+V/2+v=0$$

from which Equation 10 can be readily deduced.

A variable resistor 34 is provided which is common to the grid circuits of the valves V3$a$ and V3$b$ in order to enable the output voltages appearing at terminals $c$ and $c'$ to be balanced about earth potential.

Figure 8:
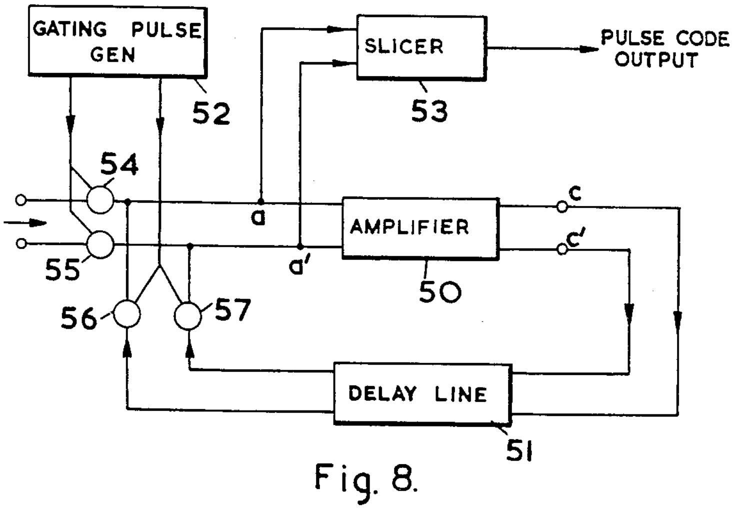

A single amplifier stage as described in connection with Figures 6 and 7 may be employed with a single slicer circuit in a feedback circuit as shown in Figure 8, to produce a multi-digit code signal in serial form which represents the amplitude of an applied signal potential. In this circuit the output on the terminals $cc'$, of an amplifier 50, which may be in the form of the stage shown in Figures 6 or 7, is applied through a delay line 51, which delays the output by one code digit period, back to its input terminals $aa'$ through gates 56 and 57. New samples of the signal potential to be coded can be applied to the amplifier stages 50 through gates 54 and 55. A gating pulse generator 52 is provided to control the gates 56 and 57 so that they are normally open but are closed at intervals of $n$ digit periods, and to control the gates 54 and 55 so that they are normally closed, but are open when the gates 56 and 57 are closed, so that the new samples of the signal potential can be applied to the coding circuit. The gates 54 to 57 may be double diode gates as previously described.

A slicer circuit 53 compares the signal potentials successively presented to the terminals $aa'$ and produces a number of code digit signals, led by the most significant code digit. The number of code digits depends upon the time that the information is allowed to circulate round the system, and is of course controlled by the generator 52.

Figures 2, 3, and 8 show in diagrammatic form, slicer or comparison circuits which are capable of producing a pulse code digit signal indicative of the nature of an applied push-pull signal. Each of these slicers is required to produce a code signal of one kind if the potential difference between the two push-pull signals is in one sense, or produce a code signal of another kind if the potential difference is in the other sense. This may be carried out by employing a balanced slicer, the essential circuit features of which are shown in Figure 9, to determine which of the two applied potentials is the more positive.

Figure 9:
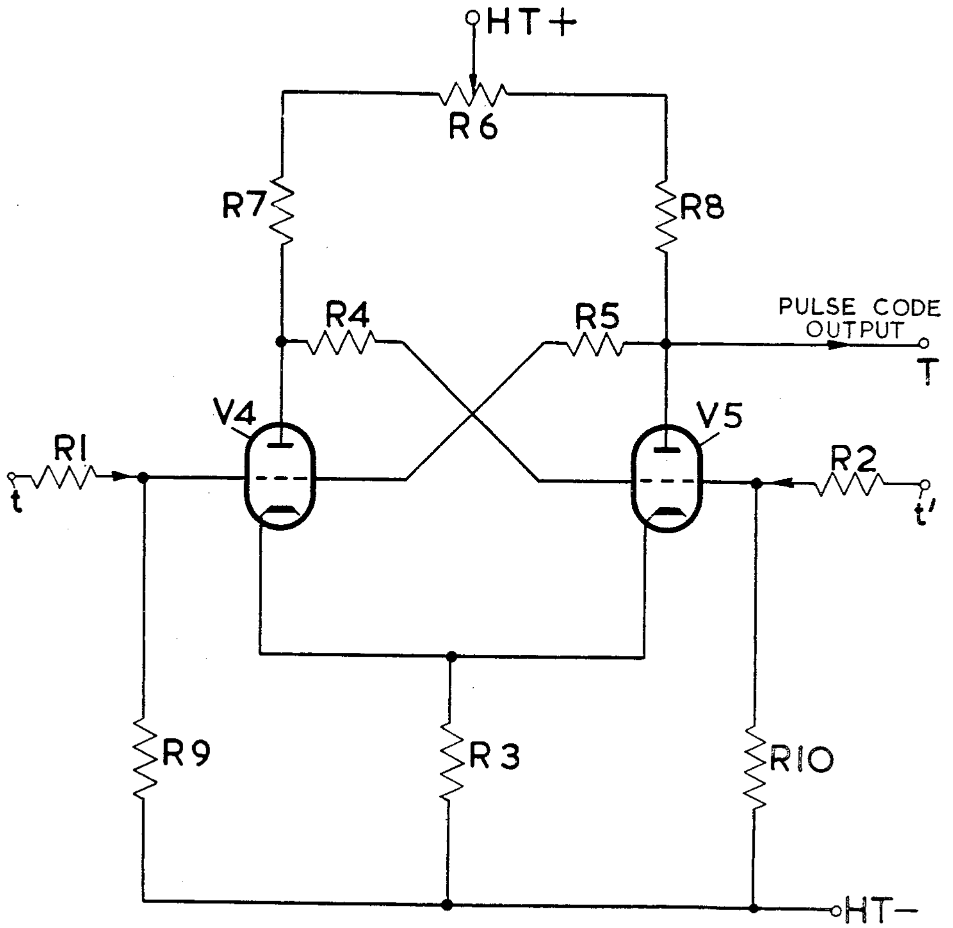

As shown in Figure 9 the balanced slicer consists essentially of two matched valves V4 and V5, having a common cathode resistor R3 connected to a negative H. T. supply voltage, and anode resistors R7 and R8 respectively, connected to a positive H. T. supply voltage through the complementary parts of a variable resistor R6, which may be adjusted to balance the valves. The push-pull signal potentials, from the terminals $aa'$ in either Figures 2, 3 or 8, are applied to the grids of valves V4 and V5 through a terminal $t$ and a resistor R1 and a terminal $t'$ and a resistor R2 respectively. Positive feedback is provided in both senses between the two valves V4 and V5 by resistors R4 and R5, cross-connected between the anodes and grids of the valves as shown. The value of the positive feedback is adjusted so that the gain of each valve approaches infinity.

Thus when the potential applied to the terminal $t$ is slightly positive with respect to the potential applied to the terminal $t'$, the valve V4 passes more current than the valve V5. The anode potential of valve V4 drops below that of valve V5 and causes the difference in the potentials on the valve grids to be emphasised by the action of the feedback resistors R4 and R5. The action is cumulative and the valve V4 quickly becomes fully conducting and the valve V5 cut-off. As a result a high-level voltage which constitutes a code digit signal of one kind is produced on the output terminal T.

Alternatively, when the potential applied to the terminal $t$ is slightly negative with respect to the potential applied to the terminal $t'$, the valve V4 becomes completely cut-off and the valve V5 fully conducting. In this case a low-level voltage which constitutes a code digit signal of another kind is produced on the output terminal T.

The valves V4 and V5 may be a double triode valve type 12AX7 and then suitable component values are as follows:

| | | |
|---|---|---|
| R1, R2 | kilohms | 7.5 |
| R3 | do | 110 |
| R4, R5 | do | 470 |
| R6 | do | 25 |
| R7, R8 | do | 62 |
| R9, R10 | megohm | 1 |

If the slicer is required to work at speeds greater than 20,000 code digits/second the 12AX7 type valve should be replaced by a 6J6, 12AT7 or similar valve, and the component values reduced.

Figure 10:
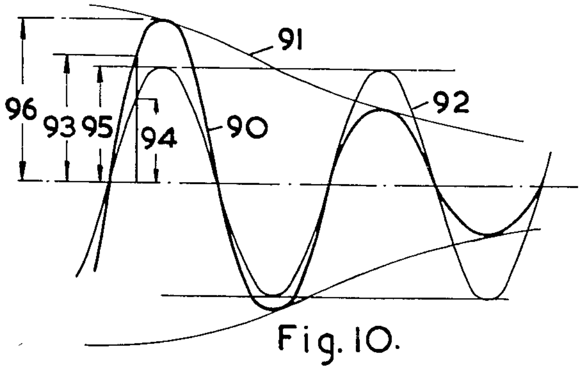
Figure 10 shows a voltage waveform diagram illustrating one application of the invention.

The group of code digit signals obtained by any one of the embodiments of the invention which have now been described, denotes the amplitude of a signal potential measured on a scale which has a maximum value corresponding to the arbitrarily set maximum permitted value of the signal potential. The value of the signal potential denoted is also not an absolute value, but its value relative to a reference potential. It follows, therefore, that by providing an unmodulated carrier signal kept in phase by phase-sensitive rectifiers, it is possible to code directly the modulation of an amplitude modulated carrier signal. For example, as shown in Figure 10, the modulation 91 of the amplitude modulated signal 90 may be coded by comparing the value of the signal 90 with the value of the unmodulated in-phase carrier signal 92. This may be done during any part of any positive-going half-cycle as the ratio of the amplitude of the signal 90 to the signal 92 is independent of the instant at which the comparison takes place within a positive-going half-cycle. For example, the ratio of the amplitudes 95 and 96 is substantially equal to the ratio of the amplitudes 94 and 93.

What I claim is:

1. In a cyclic permuting pulse code system, a circuit arrangement for modifying the signal potential between the derivation of two successive code digits, and comprising a rectifier bridge having two input connections for separately applying a signal potential and a reference potential to said bridge, and having first and second output connections on which the more negative and more positive of the two applied potentials are produced respectively, a potential amplifying and modifying circuit to which the output of the bridge is applied, said circuit doubling the potential difference between the two potentials applied thereto and changing the more positive potential by a predetermined potential in a negative sense with respect to the more negative potential.

2. A circuit arrangement according to claim 1 in combination with a slicer circuit which compares the potential derived from the first bridge output connection with the potential derived from the second bridge output connection and generates a pulse code digit which is of a first kind if the first potential is positive with respect to the second potential, and which is of a second kind if otherwise.

3. In a cyclic permuting code system, a series of circuit arrangements as claimed in claim 1 and in which the input impedance of each network is matched to the output impedance of the preceding circuit arrangement.

4. In a cyclic permuting code system, a circuit arrangement as claimed in claim 1 having its output connections connected to its input connections through an external delay line circuit, means for applying a signal potential and reference potential to the circuit arrangement and subsequently allowing the two potentials to circulate through the circuit arrangement *n* times, *n* being the number of code digit signals it is desired to produce, a slicer circuit for producing a series of *n* code digits, the nature of each digit depending upon the polarity of the potential applied to a given input connection with respect to the potential applied to the other input connection.

5. In a potential rectifying and modifying circuit as described, a four arm rectifier bridge having a rectifier in each arm, a respective lead to an input source connected to each of two opposite arm-junctions, a first series resistor connected between the load and the arm-junction through which rectified current returns to the bridge, a first resistor connected to that end of the first series resistor adjacent the arm-junction and to a source of negative potential, a second resistor connected to the other end of the first series resistor and to a source of positive potential, a second series resistor connected between the load and the arm-junction through which rectified current leaves the bridge, a third resistor connected to that end of the second series resistor adjacent the bridge and to a source of positive potential, and a fourth resistor connected to the other end of the second series resistor and to a source of negative potential.

6. A potential rectifying and modifying system as defined in claim 5, wherein the first series resistor and the first and second resistors are respectively equal to the second series resistor and the fourth and third resistors, the sources of negative potential are equal and the sources of positive potential are equal.

7. A system for deriving cyclic permuting binary code signals, including a plurality of potential rectifying and modifying circuits as defined in claim 5 connected in cascade, a comparison circuit connected across the input of the first of the said circuits in cascade and a like comparison circuit connected across the output of each of the circuits in cascade, the comparison circuits being conditioned to respond to the signal potential and the reference potential present in the respective output and to give a code digit signal of one of two kinds depending upon which of the signal potential or the reference potential is more positive.

8. A system for deriving cyclic permuting binary code signals, including a plurality of potential rectifying and modifying circuits as defined in claim 5 connected in cascade, a comparison circuit, means respectively connecting the input of the first of the circuits in cascade and the output of each of the circuits in cascade to the input of the comparison circuit, each of the respective connecting means including gating devices, a gating pulse generator, and means including a respective delay device connected ahead of each gating stage connecting the gating pulse generator to each of the gating stages, whereby to apply to the comparison circuit seriatim the potentials at the respective points of connection to the said circuits in cascade.

9. A system for deriving cyclic permuting binary code signals, including a four arm rectifier bridge having a rectifier in each arm, input connections connected to two opposite arm-junctions, a respective series resistor connected to each of the other two arm-junctions, a first resistor connected to that end of one series resistor remote from the bridge and to a source of positive potential, a second resistor connected to that end of the other series resistor remote from the bridge and to a source of negative potential, an amplifier having input leads connected respectively to the two series resistors at their ends remote from the bridge, output leads from the amplifier, and means each including a resistor respectively connecting each amplifier output lead to an input lead of the amplifier.

10. A system as defined in claim 9, wherein the first and second resistors are of equal value, the resistors connecting the output of the amplifier back to the input thereof are each of twice the value of the first and second resistors, and the amplifier is conditioned to have an amplification of two.

11. Apparatus for obtaining a plurality of binary digit signals representing in accordance with a cyclic permuting code the amplitude of a signal potential and comprising a series of code digit stages each feeding the next stage and producing a binary code digit which is of less significance than that produced by a preceding stage, the first stage comprising a comparison circuit for making a comparison between the signal potential and a reference potential and generating a first code digit in accordance with the result of this comparison, a rectifier bridge to which the signal potential and reference potentials are applied and which produces the more negative of the two potentials on a first output lead and the more positive on a second output lead, potential modifying means for changing the potential difference between the potentials on the two output leads by a predetermined potential in such a sense that the potential on the first output lead is made relatively more positive, and each subsequent stage comprising a comparison circuit for making a comparison between the potentials appearing on the two output leads of the preceding stage after they have passed through the potential modifying means of the preceding stage and for producing a code digit in accordance with the result of this comparison, a rectifier bridge to which the two compared potentials are applied and which produces the more negative of the two compared potentials on a first output lead and the more positive of the two compared potentials on a second output lead, potential modifying means for changing the potential difference between the potentials on the two output leads by a predetermined potential so that the potential on the first output lead is made relatively more positive, the predetermined potential in each stage being one-half of the predetermined potential employed in the preceding stage.

12. Apparatus for obtaining a plurality of binary digit signals representing in accordance with a cyclic permuting code the amplitude of a signal potential and comprising a series of code digit stages each of which is arranged to produce a binary digit which is of less significance than that produced by the preceding stage thereto, each stage being arranged to produce two output potentials for feeding the following stage which are derived from the two potentials arranged to be fed from the preceding stage, the leading stage being arranged to be fed with the signal potential and a reference potential, and each stage comprising a comparison circuit for making a comparison between the two potentials fed to the stage and for generating a binary code digit signal of a kind depending upon which of the two potentials is the greater, a rectifier bridge to which the two compared potentials are applied and which produces the more negative of the two potentials on a first lead and the more positive on a second lead, potential modifying means for changing the potential difference between the potentials on the two leads by a predetermined potential in such a sense that the potential on the first lead is made relatively more positive, the two potentials produced by the potential modifying means being the two output potentials of the stage and the value of the predetermined potential for each stage being one-half of the value of the predetermined potential of the preceding stage.

13. Apparatus for obtaining a plurality of binary digit signals representing the amplitude of a signal potential according to claim 12 and in which the comparison circuits of each stage are combined in a single comparison circuit, a path from each stage to the said comparison circuit by which the two potentials to be compared in each stage can be applied to the said comparison circuit, a gate circuit in the path from each stage, and means for opening the gate circuits in turn to permit the said comparison circuit to derive a serial train of code digit signals representing the amplitude of the applied signal potential.

14. Apparatus for obtaining a plurality of binary digit signals representing in accordance with a cyclic permuting code the amplitude of a signal potential and comprising a series of code digit stages, the leading stage being arranged to be fed with the signal potential and a reference potential and each stage being arranged to feed the following stage with two output potentials derived from the two potentials supplied from the preceding stage, each stage comprising a rectifier bridge to which the two potentials fed to the stage are applied and which produces the more negative of the two potentials on a first lead and the more positive on a second lead, and potential modifying means for changing the potential difference between the potentials on the two leads by a predetermined potential in such a sense that the potential on the first lead is made relatively more positive, the two potentials produced by the potential modifying means being the two output potentials of the stage and the value of the predetermined potential for each stage being one-half of the value of the predetermined potential of the preceding stage, a comparison circuit for generating a binary digit signal of a kind depending upon which of two applied potentials is the more positive, and means for supplying the comparison circuit with the two potentials applied to each stage in turn whereby the comparison circuit can derive a serial train of digit signals representing the amplitude of the applied signal potential.

15. In a cyclic permuting pulse code system for producing code digit signals representing amplitude levels of a signal potential, a network for modifying the signal potential between the derivation of the $n^{th}$ and $(n+1)^{th}$ code digit signals, $n$ and $(n+1)$ being the numbers of two consecutive code digit signals in the group, comprising a rectifier bridge having two input connections for separately applying a signal potential and a reference potential to said bridge, and having a first output connection on which the more negative of the two potentials is produced and a second output connection on which the more positive of the two potentials is produced, a potential modifying network to which the two potentials appearing on the first and second bridge output connections are applied, the network being arranged to produce a first and second network output potential derived respectively from the potential on the first and second bridge output connections in such a manner that the potential appearing on the first bridge output connection is changed in a positive sense with respect to the potential appearing on the second bridge output connection by $(1/2)^n$ of a predetermined potential, said potential modifying circuits changing the potentials appearing on said bridge output connections by equal amounts in opposite senses.

16. In a cyclic permuting pulse code system for producing code digit signals representing amplitude levels of a signal potential, a network for modifying the signal potential between the derivation of the $n^{th}$ and $(n+1)^{th}$ code digit signals, $n$ and $(n+1)$ being the numbers of two consecutive code digit signals in the group, comprising a rectifier bridge having two input connections for separately applying a signal potential and a reference potential to said bridge, and having a first output connection on which the more negative of the two potentials is produced and a second output connection on which the more positive of the two potentials is produced, a potential modifying network to which the two potentials appearing on the first and second bridge output connections are applied, the network being arranged to produce a first and second network output potential derived respectively from the potential on the first and second bridge output connections in such a manner that the potential appearing on the first bridge output connection is changed in a positive sense with respect to the potential appearing on the second bridge output connection by $(1/2)^n$ of a predetermined potential, and a slicer circuit which compares the first and second network output potentials and generates an $(n+1)^{th}$ pulse code digit which is of a first kind if the first network output potential is positive with respect to the second network output potential, and which is of a second kind if otherwise.

17. In a cyclic permuting pulse code system for producing code digit signals representing amplitude levels of a signal potential, a network for modifying the signal potential between the derivation of the $n^{th}$ and $(n+1)^{th}$ code digit signals, $n$ and $(n+1)$ being the numbers of two consecutive code digit signals in the group, comprising a rectifier bridge having two input connections for separately applying a signal potential and a reference potential to said bridge, and having a first output connection on which the more negative of the two potentials is produced and a second output connection on which the more positive of the two potentials is produced, a potential modifying network to which the two potentials appearing on the first and second bridge output connections are applied, the network being arranged to produce a first and second network output potential derived respectively from the potential on the first and second bridge output connections in such a manner that the potential appearing on the first bridge output connection is changed in a positive sense with respect to the potential appearing on the second bridge output connection by $(1/2)^n$ of a predetermined potential, and a series resistor connected to the first bridge output, a first resistor connected to that end of the series resistor adjacent the bridge and to a source of negative potential, and a second resistor connected to the other end of the series resistor and to a source of positive potential.

18. In a cyclic permuting pulse code system for producing code digit signals representing amplitude levels of a signal potential, a network for modifying the signal potential between the derivation of the $n^{th}$ and $(n+1)^{th}$ code digit signals, $n$ and $(n+1)$ being the numbers of two consecutive code digit signals in the group, comprising a rectifier bridge having two input connections for separately applying a signal potential and a reference potential to said bridge, and having a first output connection on which the more negative of the two potentials is produced and a second output connection on which the more positive of the two potentials is produced, a potential modifying network to which the two potentials appearing on the first and second bridge output connections are applied, the network being arranged to produce a first and second network output potential derived respectively from the potential on the first and second bridge output connections in such a manner that the potential appearing on the first bridge output connection is changed in a positive sense with respect to the potential appearing on the second bridge output connection by $(1/2)^n$ of a predetermined potential, and a series resistor connected to the first bridge output, a first resistor connected to that end of the series resistor adjacent the bridge and to a source of negative potential, a second resistor connected to the other end of the series resistor and to a source of positive potential, a second series resistor connected to the second bridge output, a third resistor connected to the end of the second series resistor adjacent the bridge and to a source of positive potential, and a fourth resistor connected to the other end of the second series resistor and to a source of negative potential.

References Cited in the file of this patent

UNITED STATES PATENTS

| | | |
|---|---|---|
| 2,104,336 | Tuttle | Jan. 4, 1938 |
| 2,358,545 | Wendt | Sept. 19, 1944 |
| 2,577,015 | Johnson | Dec. 4, 1951 |
| 2,581,798 | Kallmann | Jan. 8, 1952 |
| 2,592,061 | Oxford | Apr. 8, 1952 |